June 29, 1937.   E. W. KELLOGG   2,085,194
RECORDING AND REPRODUCTION OF IMPULSES
Filed Dec. 28, 1933
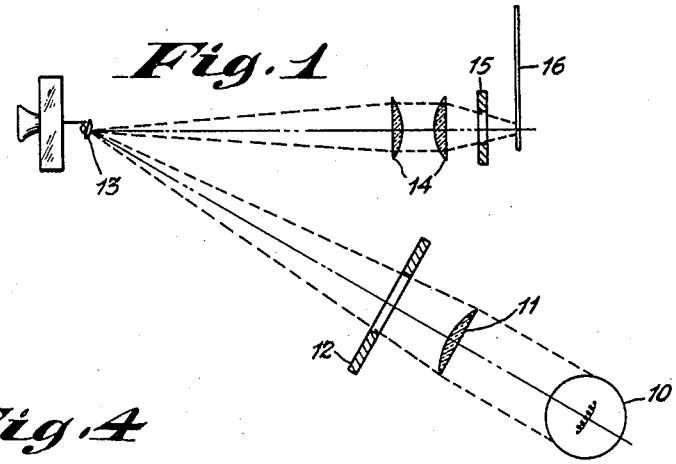
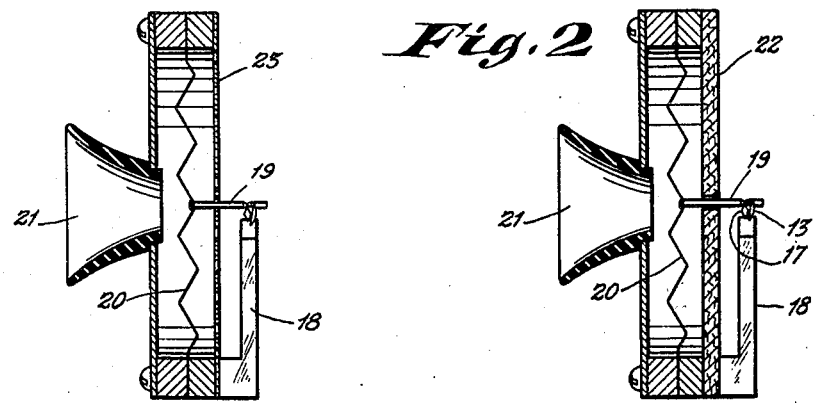
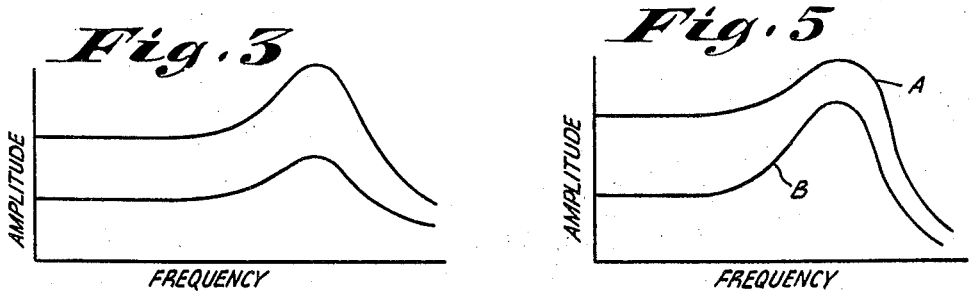
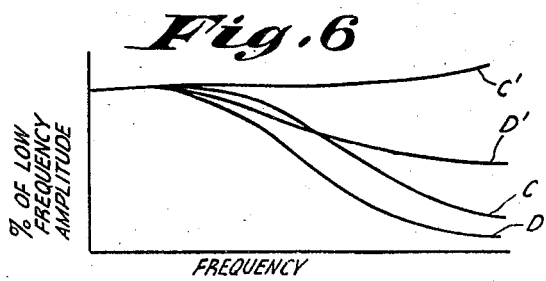
INVENTOR
EDWARD W KELLOGG
BY
ATTORNEY Patented June 29, 1937

2,085,194

UNITED STATES PATENT OFFICE 2,085,194

RECORDING AND REPRODUCTION OF IMPULSES

Edward W. Kellogg, Moorestown, N. J., assignor to Radio Corporation of America, a corporation of Delaware Application December 28, 1933, Serial No. 704,249

3 Claims. (Cl. 274—5)

This invention relates to the recording and reproducing of impulses, such as those of audio frequency, and has for its principal object the provision of an improved apparatus and method of operation whereby the response at particular frequencies or ranges of frequencies is so controlled as to avoid undesired distortion or to produce a more artistic effect.

Damping means for acoustic and other devices have been employed in the past, in which the flow of gas or liquid through small passages affords the desired energy absorption, but I have not found any recognition of the question whether the energy absorption in any of the constructions proposed or used would be the result of viscosity of the fluid, or of turbulence. In the case of turbulence the power dissipated is proportional to the cube of the velocity whereas in viscous resistance the power loss is proportional to the square of the velocity. It is well known that for distortionless reproduction of sound, any resistance elements employed must have the property of consuming power in proportion to the square of the instantaneous velocity, and for this reason true viscous damping has been sought and employed in acoustic devices, but in spite of the fact that turbulence damping introduces some distortion, it possesses certain characteristics which may be utilized to advantage, in accordance with my present invention.

In the construction of sound picture recorders, it is sometimes desired to accentuate a certain range of frequencies in order to compensate for film losses. This result may be produced by designing the diaphragm of the acoustic recording element to resonate in this range, and regulating the magnitude of the accentuation by damping. If the damping is relatively small, the peak in the response will be high and the frequency range affected by the diaphragm resonance will be highly accentuated. If the damping is relatively large, less accentuation or lower response throughout this frequency range is realized.

If there is provided back of the diaphragm a small chamber having a wall of porous material through which air escapes by way of very minute and relatively long passages or capillary tubes the energy loss is due principally to the viscosity of the air or to viscous damping. The damping in such a system is substantially independent of the amplitude of the impulse waves applied to the diaphragm. Under these conditions, the forms of the response curves at different amplitude levels are substantially the same.

If the small space behind the diaphragm is provided with a thin wall having small holes, however, the energy loss is due, for the most part, to turbulence damping and the energy loss is proportional to the cube of the impulse wave velocity instead of the square as in the case of viscous damping. This results in a strong damping effect when the wave amplitude and velocity are large and a weaker damping effect when the amplitude is small. Since there is little damping effect except within the frequency band close to diaphragm resonance, it follows that turbulence damping in this particular range functions to reduce the response of high amplitude vibrations to a much greater extent than low amplitude vibrations. This has the advantage that a given range of frequencies may be toned down or controlled at the higher amplitude levels to harmonize with frequencies outside this range.

An important object of the invention, is the provision of means whereby the response at a particular range of frequencies may be subjected to a comparatively small energy loss at low amplitudes and to a comparatively large energy loss at high amplitudes.

A further object is the provision of means whereby the response at a predetermined high frequency range is subjected to an energy loss which has a greater effect at high amplitudes than at low amplitudes.

An auxiliary object is the provision of an improved acoustically responsive device including a resonant system which is controlled by turbulence damping or by combined turbulence damping and stiffness.

The invention will be better understood from the following description when considered in connection with the accompanying drawing, and its scope will be pointed out in the appended claims.

Referring to the drawing,

Fig. 1 is a diagrammatic showing of an impulse recording system to which the invention has been applied, Fig. 2 illustrates an acoustic recording device which operates with viscous damping, Fig. 3 shows curves illustrating the operation of the device of Fig. 2, Fig. 4 illustrates an acoustic recording device which operates with turbulence damping, Fig. 5 shows curves illustrating the operation of the device of Fig. 4, and Fig. 6 illustrates the characteristics derived from combined stiffness and turbulence damping.

The system of Fig. 1 includes a light source 10 from which light is projected through a lens 11 and a mask 12 to a lens mirror 13 which is vibrated in accordance with the impulses to be recorded. From the mirror 13, light is reflected through lenses 14 and a mask 15 to a light sensitive record 16.

As shown more clearly in Fig. 2, the mirror 13 is mounted on a diamond-shaped or other suitably shaped rod 17 which is pivoted at its lower edge to a support 18 and at its upper edge to a rod 19 arranged to be moved or vibrated by a diaphragm 20 mounted within an enclosure. This enclosure is provided at the front with a mouth piece 21 and at the back with a porous wall 22 having capillary passages. Due to the fact that the damping produced in the capillary passages in the wall 22, is due to the viscosity of the air, constant damping is obtained and the form of the response curve at different amplitude levels is substantially the same (see Fig. 3) regardless of the velocity of wave movement.

The device of Fig. 4 is in most respects similar to that of Fig. 2. It differs in that its foraminous rear wall 23 is relatively thin. As indicated by Fig. 5, the device of Fig. 4 gives less accentuation of the high frequencies, when the amplitudes are high than at low amplitudes or, in other words, with weaker sounds. Thus it will be observed that, at the lower frequencies, the amplitude of the A curve is about double that of the B curve while, at the higher frequencies in the resonance range, the amplitude difference is greatly reduced. In a system of this character, the high frequency response is not sharply limited and any increase in amplitude, wave velocity, or actuating force always results in an increase in amplitude but at a reduced rate as compared with the increase in response at low frequency. Such a characteristic has the advantage that it helps to preserve all the high frequencies present in voices in which they are deficient and relatively tempers the high frequencies in voices in which they are excessive.

If it is desired to control a larger part of the frequency spectrum than that to which the diaphragm or other mechanical parts of the acoustic device are resonant, stiffness may be employed in conjunction with turbulence or resistance damping. The relation between the high and low frequency responses then depends on the relative magnitudes of the stiffness and resistance factors, an increase in the turbulence resistance factor tending to decrease the relative high frequency response and vice versa.

Fig. 6 shows curves C, D, C' and D' which are the characteristics of a device controlled by stiffness at low frequency and by turbulence resistance or damping at high frequency, the low frequency response being taken as 100%. At small force and small damping the curve C is obtained and at large force and high damping the curve D is obtained. The curves C' and D' represent the corresponding characteristics as compensated to give on the average about the same response at high frequency as at low. It might be desirable for example to compensate for the general drooping tendency of the amplitude-frequency characteristic C, D of Fig. 6 by a fixed rising characteristic in the amplifier, thus giving the desired overall characteristic at any specified level. How this result may be achieved is well known to those skilled in the art. Turbulence still acts selectively to hold down the response in a certain part of the sound spectrum when the amplitudes in this region are exceptionally strong.

By suitable adjustment of the factors—mass, stiffness, and resistance, the part of the frequency spectrum which is affected by this limiting action and the degree to which it is affected can be controlled. In other words, the part of the sound spectrum within which the amplitude is controlled by resistance can be adjusted. Correcting networks can then be applied in the amplifiers to give the desired general characteristics. In the design of a record cutter it is present practice to have the amplitude controlled by mechanical resistance throughout almost the entire frequency range. This gives constant velocity for constant applied force. With such a cutter it would not be possible to employ turbulence damping to hold down excessive response within a limited frequency range. But a cutter might be employed in which the amplitude is controlled by stiffness up to say 2000 cycles, by resistance from about 2000 to 4000 cycles and by mass from 4000 cycles up. Electrical compensation could be applied to give such a cutter and recording system the same overall characteristics as the present system. If the resistance factor were constant, present results would be duplicated. If a resistance of the turbulence type were substituted, then in the part of the frequency band in which resistance controls (approximately 2000 to 4000 cycles in the case taken for illustration) a partial limiting effect would be obtained, tending to give full value to the tones within this range provided they are not excessive but reducing their intensity relative to other tones, when they are very strong.

I claim:
1. An acoustic device including an enclosure provided at one side with a mouth piece and at another side with a thin wall perforated by small openings, a diaphragm mounted intermediate said sides, a recording element, and coupling means interposed between said diaphragm and said element.

2. An acoustic device including an enclosure provided at one side with a mouth piece and at another side with a thin perforated wall, a diaphragm mounted intermediate said sides, a light reflector, and means interposed between said diaphragm and reflector for causing them to be moved in synchronism with one another.

3. An acoustic device including mechanical reactance means for controlling the amplitude of the response within a part of the frequency range, and means responsive to turbulent fluid movements for producing mechanical resistance whereby said response is controlled thru another part of said range.

EDWARD W. KELLOGG.